US006737907B2

(12) United States Patent
Hsu et al.

(10) Patent No.: US 6,737,907 B2
(45) Date of Patent: May 18, 2004

(54) PROGRAMMABLE DC VOLTAGE GENERATOR SYSTEM

(75) Inventors: Louis L. Hsu, Fishkill, NY (US); Li-Kong Wang, Montvale, NJ (US); John Atkinson Fifield, Underhill, VT (US); Wayne F. Ellis, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/898,328

(22) Filed: Jul. 3, 2001

(65) Prior Publication Data

US 2003/0052729 A1 Mar. 20, 2003

(51) Int. Cl.[7] .................................................. G05F 1/10
(52) U.S. Cl. ....................................... 327/536; 327/535
(58) Field of Search ................................. 327/530, 534, 327/535, 537

(56) References Cited

U.S. PATENT DOCUMENTS

| | | | | |
|---|---|---|---|---|
| 5,254,883 A | * | 10/1993 | Horowitz et al. | ............. 326/30 |
| 5,258,662 A | * | 11/1993 | Skovmand | .................. 323/349 |
| 5,388,084 A | * | 2/1995 | Itoh et al. | .............. 365/185.23 |
| 5,818,766 A | | 10/1998 | Song | ..................... 365/189.11 |
| 6,114,895 A | * | 9/2000 | Stephens | ..................... 326/27 |
| 6,285,236 B1 | * | 9/2001 | Stephens | ..................... 326/27 |
| 6,320,457 B1 | * | 11/2001 | Yang | .......................... 327/536 |

* cited by examiner

Primary Examiner—Terry D. Cunningham
(74) Attorney, Agent, or Firm—Louis J. Percello; Dilworth & Barrese, LLP

(57) ABSTRACT

A digitally programmable DC voltage generator system having a programming circuit for controlling a control circuit of a voltage generator system. The programming circuit receives an input control signal, processes the input control signal, and generates an output control signal to the control circuit of the voltage generator system for controlling the control circuit in accordance with the input control signal. The control circuit includes a limiter circuit and an oscillator circuit. The output control signal controls at least one of the limiter circuit for disabling the oscillator circuit upon reaching a target output voltage, and the oscillator circuit for controlling the pumping speed of the oscillator circuit.

22 Claims, 5 Drawing Sheets

PROGRAMMABLE DC VOLTAGE GENERATOR SYSTEM

FIELD OF THE INVENTION

The invention relates to the field of integrated circuit (IC) design. Specifically, it relates to a programmable DC voltage generator system for a semiconductor chip.

BACKGROUND OF THE INVENTION

A semiconductor memory unit of an integrated circuit (IC) system is typically arranged in an array of cells, where each cell stores a small charge representing one bit of information (1 or 0). In a memory unit such as a dynamic random access memory (DRAM) system, each cell of the array requires periodic refreshing, since the small charge stored in the cell tends to leak off due to several factors, such as an increase in the temperature of the chip. Accordingly, a DRAM system is provided with circuitry for performing a refresh operation for refreshing the cells of the DRAM array, as well as for other operations such as read and write operations.

The purpose of a DC voltage generator system on a semiconductor chip is to provide power regulation and power conversion, such as for converting a voltage provided by an external power supply to an appropriate voltage level for performing an operation executed by the chip. For example, in a conventional DRAM chip, an on-chip DC voltage generator system is used to convert a voltage supplied by an external power supply to many different voltage levels so that each different voltage level is appropriately converted for effectively supporting the various DRAM operations.

Typical components included in a DC voltage generator system for a memory system, such as a DRAM system, are a Vpp pump system for supporting boosted wordline operations to enhance access time; a Vbb pump system for biasing the body of transfer devices included in the memory array so that the subthreshold leakage of each cell of the array is minimized for insuring cell retention of a stored voltage; and a Vneg pump system for holding unselected wordlines to a predetermined negative voltage, so that transfer gates having a lower Vt may be implemented in the array, resulting in a performance gain, while maintaining low leakage.

The DC voltage generator system may further include reference voltage supply components, including a bandgap reference voltage, Vbgr, which is a constant voltage level insensitive to the supply voltage, temperature and process, used to provide a reference voltage for other circuit components; a DC voltage reference, Vrefdc, which is a voltage level that varies proportionately with the supply voltage, used for generation of a voltage proportional to the supply voltage; and a constant current reference, IREF, used as a reference for biasing analog circuits to be used such as differential amplifiers.

Each voltage pump system of the DC voltage generator system outputs a fixed voltage, thus a different pump system is used for outputting each of the generated voltages, i.e., Vneg, Vpp, and Vbb. Each pump system is custom designed to output the desired voltage, thus contributing to high manufacturing costs. Further, more than one a customized pump system is generally required for each of the voltages Vneg, Vpp, Vbb for satisfying each different operational mode, such as testing modes, active operation mode, standby mode and power-up mode, further increasing manufacturing and design costs, and consuming space on the chip.

A voltage pump system is disclosed in U.S. Pat. No. 5,818,766, entitled "Drain Voltage Pump Circuit for Nonvolatile Memory", in which the pumping rate of the pump system is tuned during an initial pumping interval by a control circuit according to a relative difference between an output voltage level and a target voltage level. Once the target voltage level has been reached by the voltage pump system, the output voltage level and pumping speed are kept constant. The target voltage level is determined by resistor components of the control circuit. Therefore, the target voltage level is a fixed voltage level. It is not possible to change the target voltage level or to selectably adjust the output voltage level and pumping speed of the voltage pump system once the target voltage level has been reached.

Accordingly, a need exists for a programmable DC generator system for enabling and controlling at least one voltage pump system to output a selectable and variable voltage level for operating a DRAM system.

SUMMARY

An aspect of the present invention is to provide a programmable DC voltage generator system having a programming circuit for controlling at least one voltage pump system of the DC voltage generator system to output and maintain a range of voltage levels for operating a DRAM system in different modes.

It is still another aspect of the present invention to provide an on-chip programmable DC voltage generator system capable of being programmed after being installed in a system such as a DRAM system.

Accordingly, a programmable DC voltage generator system is provided for driving at least one voltage pump system for generating pump voltages, such as Vbb, Vneg and Vpp, where each pump voltage operates a DRAM system during different modes, such as sleep, stand-by and active modes.

DETAILED DESCRIPTION OF THE INVENTION

The present invention provides a programmable DC voltage generator system for implementation within an integrated circuit of a semiconductor chip, such as a DRAM memory system. The programmable DC voltage generator system includes programmable voltage pump systems for generating operating voltages, e.g. Vbb, Vneg and Vpp, and voltage supplies for providing reference voltages such as Vbgr, Vrefdc and Iref. Pump speeds and output voltage levels of each voltage pump system are programmably adjusted by respective programming circuits. The programmable DC voltage generator system is preferably integrated on-chip with a system, such as a DRAM system, however in other embodiments it is an off-chip discrete component.

Figure 1:
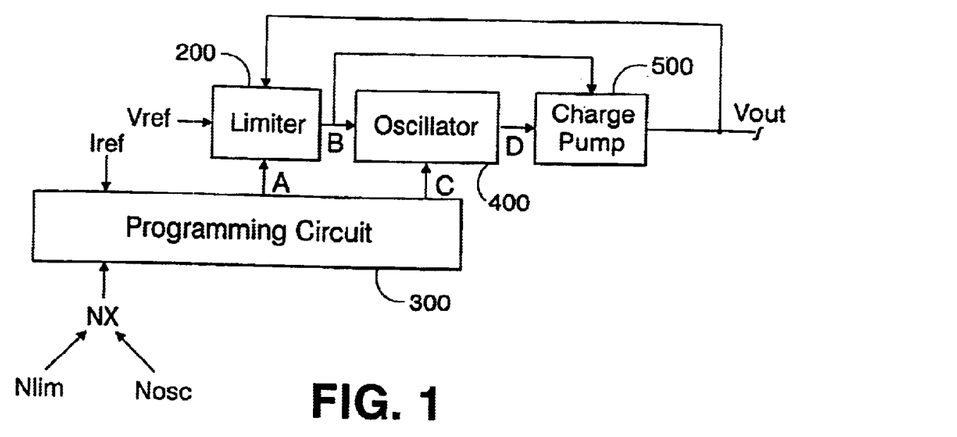
FIG. 1 is a block diagram of a programmable voltage pump system of a DC voltage generator system according to the present invention.

A programmable voltage pump system of the programmable DC voltage generator system is shown by FIG. 1 and designated generally by reference numeral 100. The voltage pump system 100 includes a limiter circuit 200, a programming circuit 300, an oscillator circuit 400, a reservoir capacitor (not shown) and a charge pump 500. Preferably, the voltage pump system 100 is a micro-electronic system consuming a minimum amount of space on a chip.

Signal input Vref is supplied to the limiter 200, and signal input Iref is supplied to the programming circuit 300. The Vref and Iref signals, voltage and current reference signals, respectively, are preferably generated by a bandgap voltage reference circuit, and may be either independent or dependent upon temperature, process being performed, and power supply level as known in the art. Digital input signal NX is supplied to the programming circuit 300 for adjusting the limiter 200 or the oscillator 300 in accordance with input request signals from a user, a processor, a sensor or an on chip BIST unit for adjusting the limiter 200 or the oscillator 400. Output voltage Vout is outputted by the voltage pump system 100 and is fed as a feedback voltage to the limiter circuit 200.

Figure 2:
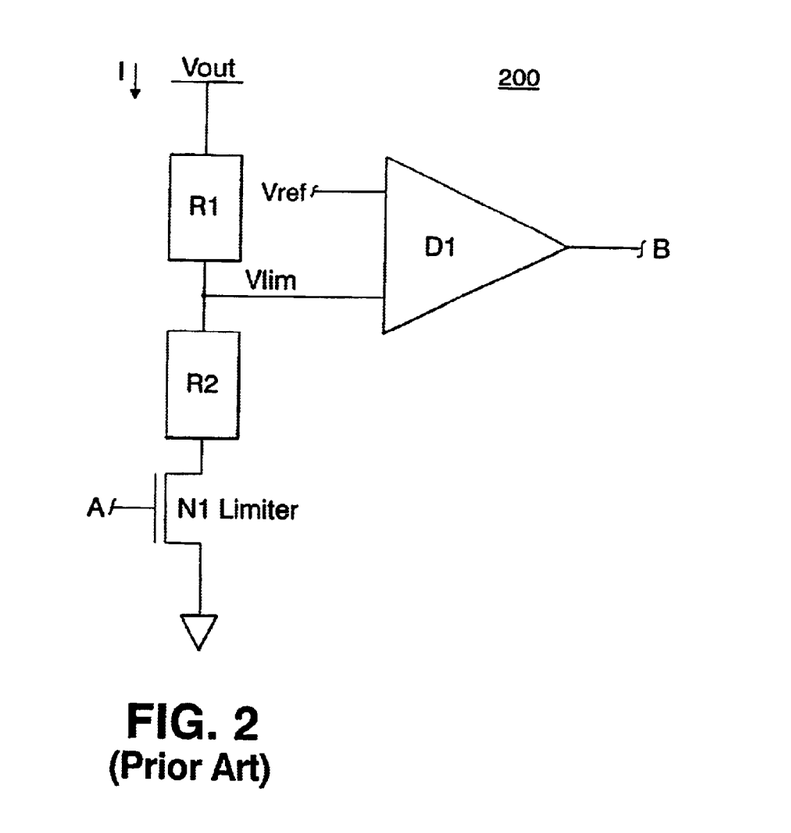
FIG. 2 is a schematic diagram of a prior art limiter circuit of the programmable voltage pump system of FIG. 1.

With reference to FIG. 2, the limiter circuit 200 as known in the art includes a resistor divider formed of a resistor chain including at least two resistor units R1, R2, and a current source formed by an nMOS transistor N1. The limiter circuit 200 receives an input signal "A" from the programming circuit 300 as well as the Vref signal. The limiter circuit 200 outputs output signal "B" to the oscillator circuit 400 for activating and deactivating the oscillator circuit 400 for controlling the voltage level of Vout.

In the limiter circuit 200, a divided voltage Vlim at a nodal junction between resistors R1, R2 is fed into a differential amplifier D1 where it is compared to Vref. The differential amplifier D1 outputs signal "B" when Vlim is greater than Vref, i.e., a predetermined targeted voltage level has been reached, to shut-off the oscillator circuit 400 and the charge pump 500 to avoid DC current leakage.

Vlim is determined by the resistance of resistors R2, R1 and the current flowing through the resistors R1, R2. Input signal "A" from the programming circuit 300 is applied to the gate of the nMOS transistor N1 for controlling the current I flowing through the resistors R1, R2. Vout is determined by the equation:

$$Vout = I \cdot R1 + Vref. \quad (1)$$

Therefore, input signal "A", which is output from the programming circuit 300 to the limiter circuit 200, is adjusted by the programming circuit 300 for controlling the voltage level of output voltage signal Vout.

Figure 3:
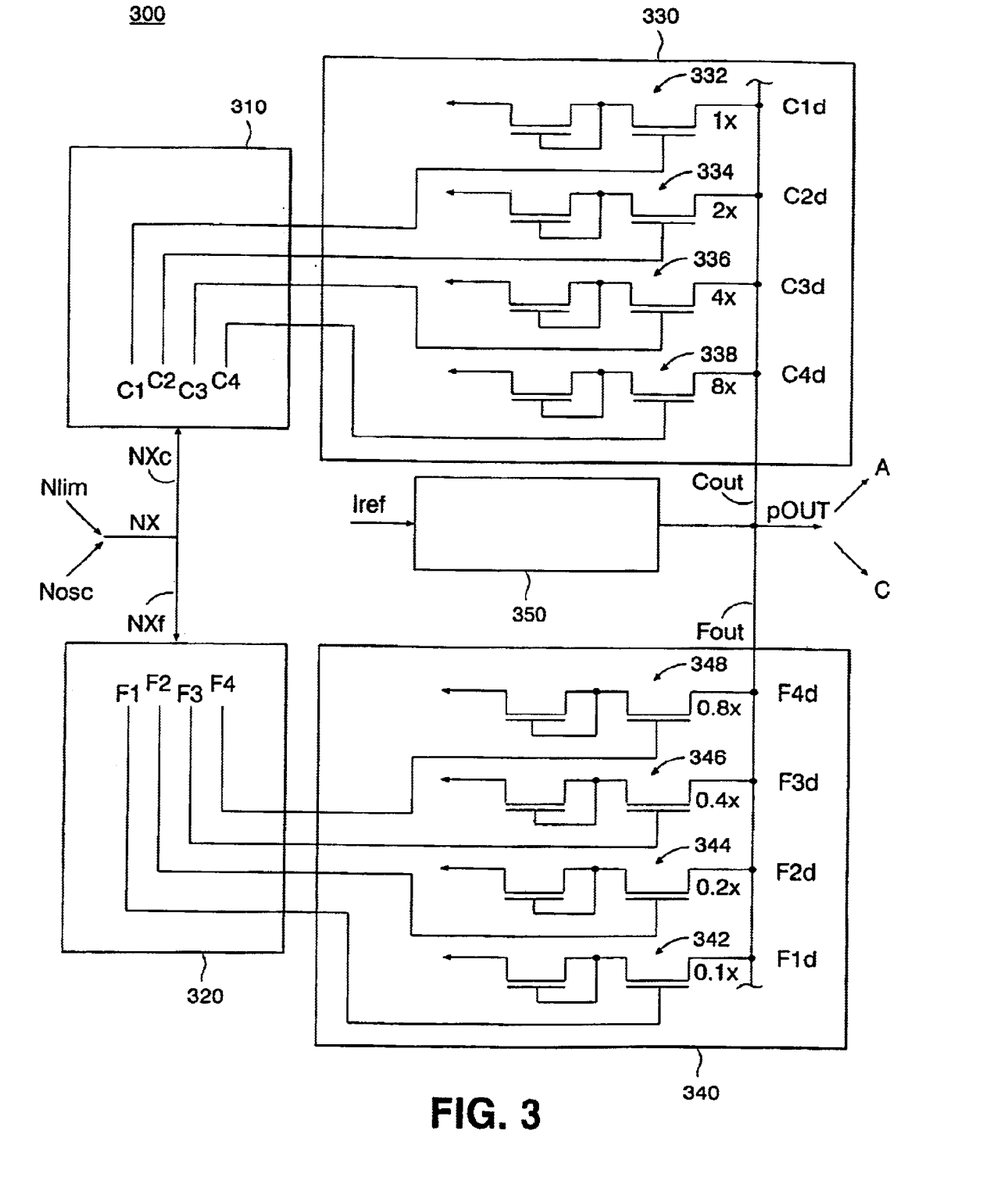
FIG. 3 is a schematic diagram of a programming circuit of the programmable voltage pump system of FIG. 1.

Referring to FIG. 3, the programming circuit 300 is shown. The programming circuit 300 includes exemplary coarse adjustment input unit 310; fine adjustment input unit 320; coarse adjustment unit 330; fine adjustment unit 340; and current mirror 350, as is known in the art. The input signal NX is received by the programming circuit 300 from a processor, for example an on-chip processor, such as a BIST unit or an external processor. The input signal NX may be determined by the processor or input by an operator. The programming circuit 300 outputs signal pOUT.

Input signal NX includes either signal Nlim or signal Nosc and the output signal pOUT includes either signal "A" or signal "C". When input signal NX includes signal Nlim, output signal pOUT includes signal "A" for controlling the limiter circuit 200. When input signal NX includes signal Nosc, output signal pOUT includes signal "C" for controlling the oscillator circuit 400.

It is contemplated that the input signal NX includes a bit to identify NX as Nlim or Nosc for instructing the programming circuit 300 to include signal "A" or "C" in output signal pOUT. It is also contemplated to provide, a programming circuit 300 for receiving input signal Nlim and outputting signal "A" to the limiter circuit 200, and another programming circuit 300 for receiving input signal Nosc and outputting signal "C" to the oscillator circuit 400.

The input signal NX is preferably digital and includes signals NXc and NXf that are respectively fed into the coarse and fine adjustment input units 310, 320. The input signal NX is split into the two signals NXc and NXf by a processing circuit or other circuits such as a splitting circuit (not shown) as known in the art.

The coarse adjustment input unit 310 receives signal NXc and converts it into a binary combination of signals C1–C4 for a best fit to the following equation, as is known in the art:

$$NXc = C1 + (2C2) + (4C3) + (8C4) + \sum_{n=5}^{\infty} 1.0(n-1)Cn \quad (2)$$

The fine adjustment input unit 320 receives signal NXf and converts it into a combination of signals F1–F4 for a best fit to the following equation, as is known art:

$$NXf = (0.1F1) + (0.2F2) + (0.4F3) + (0.8F4) + \sum_{n=5}^{\infty} 0.1(n-1)Cn \quad (3)$$

The table below shows combinations of C1–C4 and F1–F4 for providing signals Cout and Fout, respectively, and their associated current loads.

TABLE A

| COARSE | | | | | FINE | | | | |
|---|---|---|---|---|---|---|---|---|---|
| 1X | 2X | 4X | 8X | Cout | 1X | 2X | 4X | 8X | Fout |
| 0 | 0 | 0 | 0 | 0x | 0 | 0 | 0 | 0 | 0x |
| 1 | 0 | 0 | 0 | 1x | 1 | 0 | 0 | 0 | .1x |
| 0 | 1 | 0 | 0 | 2x | 0 | 1 | 0 | 0 | .2x |
| 1 | 1 | 0 | 0 | 3x | 1 | 1 | 0 | 0 | .4x |
| 0 | 0 | 1 | 0 | 4x | 0 | 0 | 1 | 0 | .4x |
| 1 | 0 | 1 | 0 | 5x | 1 | 0 | 1 | 0 | .5x |
| 0 | 1 | 1 | 0 | 6x | 0 | 1 | 1 | 0 | .6x |
| 1 | 1 | 1 | 0 | 7x | 1 | 1 | 1 | 0 | .7x |
| 0 | 0 | 0 | 1 | 8x | 0 | 0 | 0 | 1 | .8x |
| 1 | 0 | 0 | 1 | 9x | 1 | 0 | 0 | 1 | .9x |
| 0 | 1 | 0 | 1 | 10x | 0 | 1 | 0 | 1 | .10x |
| 1 | 1 | 0 | 1 | 11x | 1 | 1 | 0 | 1 | .11x |
| 0 | 0 | 1 | 1 | 12x | 0 | 0 | 1 | 1 | .12x |
| 1 | 0 | 1 | 1 | 13x | 1 | 0 | 1 | 1 | .13x |
| 0 | 1 | 1 | 1 | 14x | 0 | 1 | 1 | 1 | .14x |
| 1 | 1 | 1 | 1 | 15x | 1 | 1 | 1 | 1 | .15x |
| C1 | C2 | C3 | C4 | | F1 | F2 | F3 | F4 | |

The coarse adjustment unit 330 receives signals C1–C4, adjusts signal Cout by factors of 1x, 2x, 4x and 8x via pull down path 332, 334, 336, 338 where 1X is preferably a predetermined quantity of current (e.g., Iref), generates and combines signals C1d–C4d, and outputs signal Cout. The fine adjustment unit 340 receives signals F1–F4, adjusts signal Fout by factors of 0.1x, 0.2x, 0.4x and 0.8x via pull down path 342, 344, 346, 348 where 1X is preferably a current (e.g., Iref), generates and combines signals F1d–F4d, and outputs signal Fout. The reference current, i.e., input signal Iref, is provided as an input current to current mirror 350. The output signal of the current mirror 350 is combined with signals Cout and Fout to produce signal pOUT.

The coarse current and adjustment circuit 330 biases and adjusts the current load occurring at mode 332. The coarse current adjustment circuit 330 is used together with current mirror circuit 350 for drawing current. The total amount of the current drawn depends on the input setting of C1 to C4. For example, if C1=1, C2=C3=C4=0, then the current drawn at node 332 is 1X (Iref). Based on Table A above, C1–C4 are set in a binary combination to achieve a selected current load at node 332 within the range 1.0x to 15x Iref. Similarly, the fine current adjustment circuit 340 is used in conjunction with the current mirror circuit 350 for drawing current. According to Table A, F1–F4 are set in a binary combination to achieve a selected current load for fine tuning the current drawn at node 332, e.g., to equal a load within the range 0.1x to 0.15x. Pull down devices n0, n1 are provided in association with each pull down path 332, 334, 336, 338 and 342, 344, 346, 348. Device n1 acts as a switch operated by the associated signal C1–C4, F1–F4 connected to its gate, and provides negligible resistance. The n0 device having its gate tied to the drain of n1 acts like a resistor for controlling the amount of flow of current.

The sizes of the nmos pull down devises n0, n1 are selected so that current flowing through each pull down path corresponds to Cn, Fn in accordance with the magnitude of n. For example, the size of device n0 of path 332 may be designed to be the same as device n5 of current mirror device shown in FIG. 4 for the current flow through path 332 to be identical to Iref. The n1 device of each path is, preferably, identical in size which allows the pull down path to be switched on (e.g, allows current to flow through the pull down path) when Cn=1.

Each selected input Cn and Fn, determines the current load applied at node 332 for programming and biasing the current load. The programmed current load (or current bias) can be used to adjust various circuit behaviors, such as tuning the delay of a timing circuit (or system clock). In this invention the programmable current (bias) load is used to adjust the frequency of an oscillator. It is contemplated that the programmable current be used to adjust a voltage limiter, etc. of a DC system. It is further contemplated that other bias circuitry known in the art be implemented in programming circuit 300.

Signal pOUT is fed as signal "A" to the limiter circuit 200 or as signal "C" to the oscillator circuit 400 to control the pumping speed of the voltage pump system 100, and the voltage level of Vout. Thus, Vout and the pumping speed of the voltage pump system 100 are controllable by the input signal NX.

Figure 4:
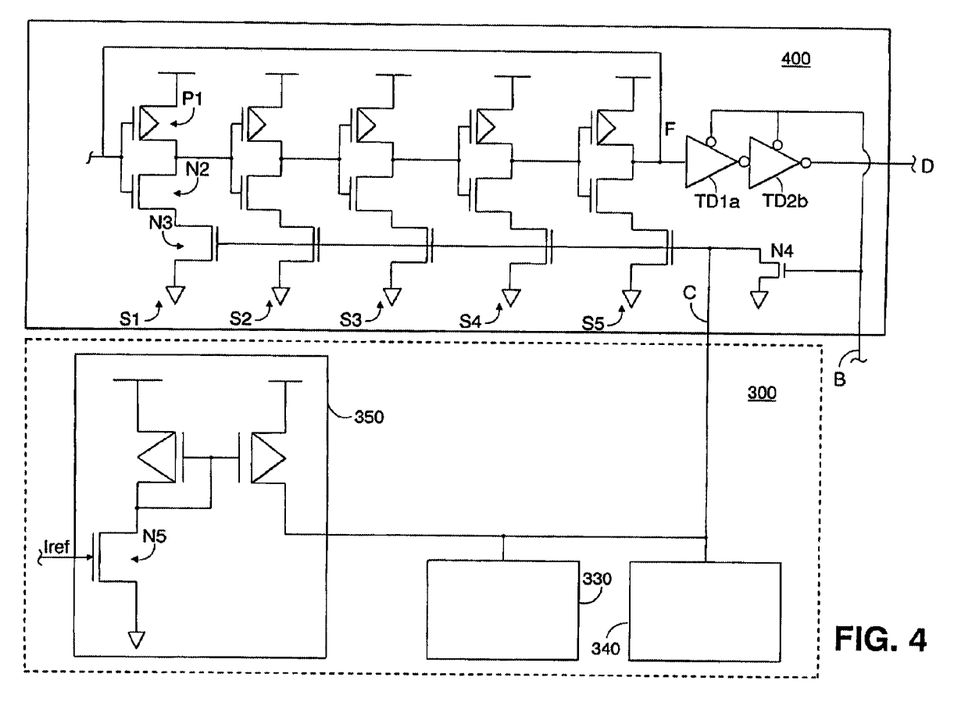
FIG. 4 is a schematic diagram of an oscillator circuit of the programmable voltage pump system of FIG. 1.

Referring to FIG. 4, the oscillator circuit 400 and the programming circuit 300 (dotted box) are shown. The speed of the voltage pump system 100 is determined by the frequency of the oscillator circuit 400. Preferably, the oscillator circuit 400 is a 5-stage ring oscillator including stages S1–S5 as known in the art. The oscillator circuit 400 further includes two output tri-state drivers TD1a, TD1b connected in series, and an nMOS transistor N4 acting as a pull down transistor. Each of the stages S1–S5 includes a pMOS transistor P1 and two nMOS transistors N2 and N3. Transistor P1 and nMOS transistor N2 form an inverter gate, and NMOS transistor N3 is an nMOS pull-down transistor.

The oscillator circuit 400 receives signal "C" from the programming circuit 300 and signal "B" from the limiter circuit 200, and outputs signal D to the charge pump 500. Signal "C" is applied to at least one of the gates of the pull down transistors N3. Signal "B" is applied to the gate of nMOS transistor N4 and to the gates of each of the pMOSs P3 of tri-state drivers TD1, TD2. Signal D is output from the second tri-state driver TD2.

Output signal F of the stage S5 is a feedback signal, which is fed to the gates of the transistors P1, N2 of the transmission gate of the stage S1. The output of the inverter gate of stages S1 through S4 is fed to the gates of the transistors P1, N2 of the inverter gate of the next stage S2–S5, respectively.

The frequency of the oscillator circuit 400 is controlled via signal "C" received from the programming circuit 300. The frequency of the oscillator circuit 400 varies proportionately to the bias current of signal C. When the biased current is high, the frequency of the oscillator is high, and vice versa. Signal "B" received from the limiter circuit 200, controls operation of the oscillator circuit 400 and the charge pump 500 for enabling or disabling the oscillator circuit 400 and the charge pump 500. When the limiter circuit 200 has determined that the predetermined targeted voltage level has been reached, signal "B" equals a logic "1" and the N3 transistors of stages S1–S5 and the tri-state drivers TD1, TD2 are switched off, causing the oscillator circuit 400 to be disabled, and stay in a high-impedance mode to save power. Likewise, when the limiter circuit 200 determines that the predetermined targeted voltage level has not yet been reached, signal "B" is equal to a logic "0" and the N3 transistors of stages S1–S5 and the tri-state drivers TD1, TD2 are switched on.

Figure 5A:
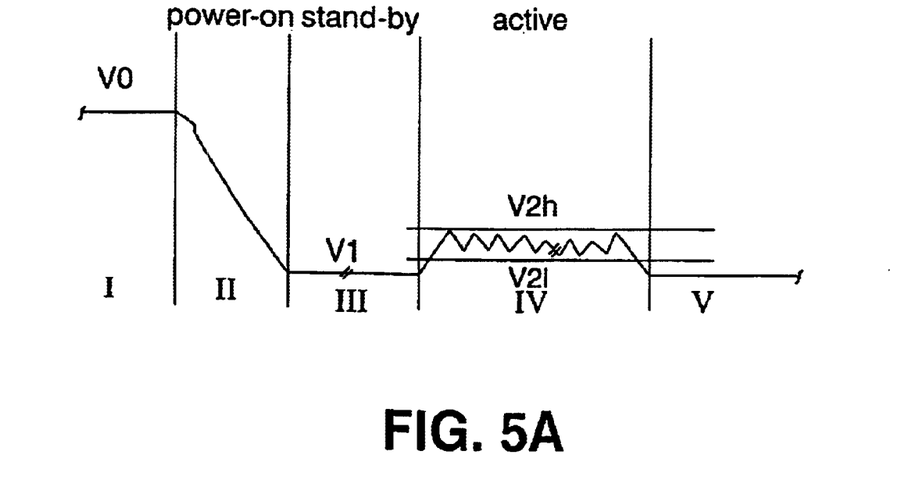
FIG. 5A is a graph of voltage levels of a voltage output by the programmable voltage pump system of FIG. 1.

An example is provided in FIG. 5A of how adjustment of the voltage level for an exemplary programmable voltage pump system 100 supplying a DRAM operating voltage, such as Vneg or Vpp, is used to eliminate coupling and switching noise generated during the active mode during a high switching activity level. FIG. 5A shows the voltage level of Vneg during phases I–V of DRAM operation using the programmable voltage pump system 100. At phase I, Vneg is initially started at voltage level V0. During phase II, i.e., a power-on phase, the voltage level of Vneg drops to voltage level V1. During phase III, i.e., a stand-by phase, the voltage-level of Vneg stays at level V1. During phase IV, i.e., an active mode, the voltage level of Vneg fluctuates between a high level V2h and a low level V2l. The fluctuation of the voltage level of Vneg may cause DRAM operational problems, such as excessive cell leakage. During phase IV, in which programming operations are performed using the programmable voltage pump system 100, a lower output level for Vneg is selected via the programming circuit 300 causing the fluctuation from the targeted level to be minimized and less charge leakage related problems to the DRAM cells. During phase V, i.e., a sleep phase in which DRAM array activity is reduced to refreshing activity, the Vneg level may be resumed to a higher voltage level to reduce of power consumption.

Figure 5B:
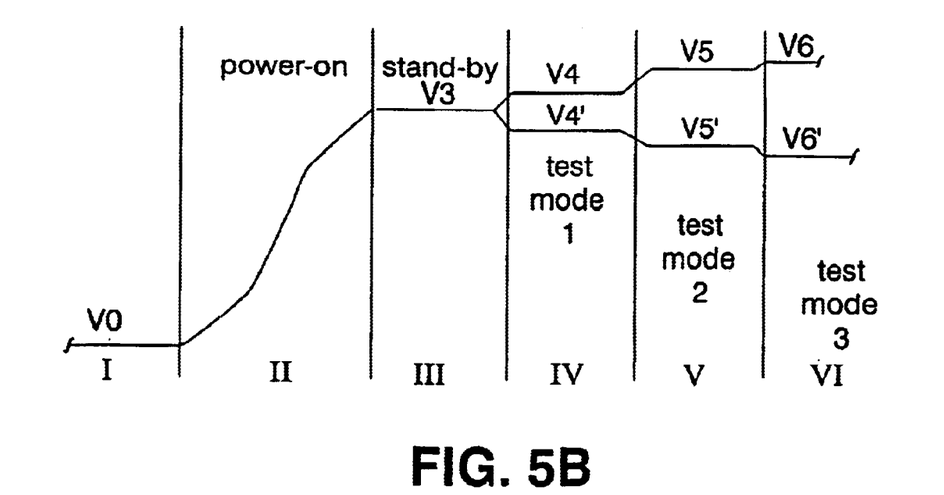
FIG. 5B is a graph of voltage levels of a voltage output by the programmable voltage pump system of FIG. 1 during testing.

An example is shown in FIG. 5B of adjustment of the voltage level of a DRAM operating voltage supplied by the voltage pump system 100 during testing. In FIG. 5B, a first test is performed in which a voltage level is programmed to different target voltage levels using the programmable voltage pump system 100. The voltage level starts at voltage level V0 during phase I; rises to voltage level V3 during phase II, a power on phase; remains at voltage level V3 during phase III; is set to voltage level V4 during phase IV, first test mode; is set to voltage level V5 during phase V, a second test mode; and is set to voltage level V6 during phase VI, a third test mode. During a second test, the voltage level is set to voltage level V4' during the first test mode; to voltage level V5' during the second test mode; and to V6' during the third test mode.

Figure 6:
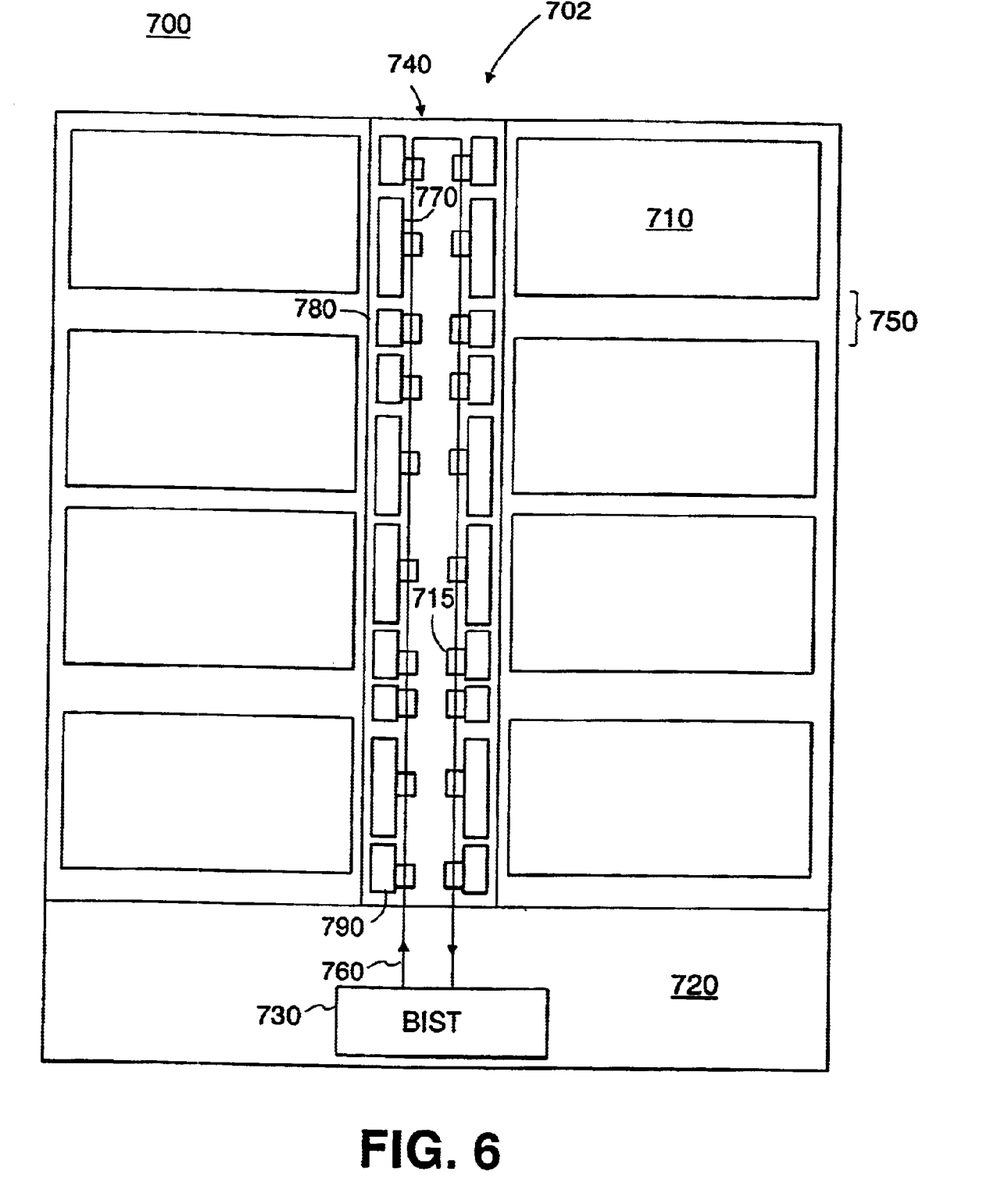
FIG. 6 is a block diagram of a DRAM macro having a programmable DC voltage generator system having a plurality of programmable voltage pump systems according to the present invention.

In FIG. 6, a DRAM macro 700 is shown having the programmable DC voltage generator system 702. The DRAM macro 700 includes at least one array 710, a spine region 740, an arm region 750, and a built-in-self-test (BIST) unit 730 located inside a head region 720. The programmable DC voltage generator system 702 includes a string of voltage pump systems similar to the programmable voltage pump system 100 strategically arranged in the spine region 740 to provide optimum power supply with selectable voltage levels to the arrays 710. The string of voltage pump systems includes groups of voltage pump systems having Vpp pump systems 770, Vneg pump systems 790, and Vbb pump systems 780. Each voltage pump system is programmable for selecting a pump speed and output voltage level. For example, one voltage pump system for each group is programmed for a stand-by mode of operation.

A chain of programmable latches 715 is provided to form a loop. A fuse bank is located near or within the BIST unit 730. Setting information for each voltage pump system is stored in the fuse bank. During a power-on phase, the setting information is sequentially scanned from the fuse bank into each respective voltage pump system via a looped scan data path 760. Row and column redundancy information may also be scanned into corresponding redundancy units (not shown) via the scan path 760. Upon completing the power-on phase, the DRAM macro 700 is ready for normal operation.

Each programmable voltage pump system of the DC voltage generator system 702 may be programmed to operate in different operation modes, reducing the quantity of voltage pump systems relative to a prior art DC voltage generator system. A standard structure may be used for each of the programmable voltage pump systems of the DC voltage generator system 702 for simplifying design and manufacturing procedures and reducing costs.

Thus, using a group of voltage pump systems according to the present invention, a voltage pump system is provided for generating various voltages for operating the DRAM macro 700. Each voltage pump system is programmable providing for selection of target voltage levels and pumping speeds for the particular voltage, for various modes of operation and various test modes of the DRAM macro 700.

What has been described herein is merely illustrative of the application of the principles of the present invention. Other arrangements and methods may be implemented by those skilled in the art without departing from the scope and spirit of the invention.

What is claimed is:

1. A programming circuit and a control circuit for controlling a charge pump of a voltage generator system, the programming circuit comprising:
    means for receiving at least one input con trot signal;
    means for processing the at least one input control signal using at least a series of bias stages;
    means for generating at least one output control signal using at least a signal outputted by the series of bias stages; and
    means for outputting the at least one output control signal to the control circuit of the voltage generator system for controlling the control circuit in accordance with the at least one input control signal,
    wherein the control circuit of the voltage generator system includes a limiter circuit and an oscillator circuit, and wherein a first input control signal of the at least one input control signal is configured for exclusively generating a first output control signal of the at least one output control signal for controlling the limiter circuit of the control circuit and a second input control signal of the at least one input control signal is configured for exclusively generating a second output control signal of the at least one output control signal for controlling the oscillator circuit of the control circuit.

2. The programming circuit according to claim 1, wherein the means for processing the at least one input control signal includes a first means for processing the first input control signal and a second means for processing the second input control signal.

3. The programming circuit according to claim 2, wherein the first output control signal is output by the first means for processing, and the second output control signal is output by the second means for processing.

4. The programming circuit according to claim 1, wherein the first input control signal is configured for indicating a target output voltage for the voltage generator system.

5. The programming circuit according to claim 4, wherein the limiter circuit includes circuitry for determining when the output voltage of the voltage generator system has reached the target output voltage indicated by the input signal, and upon a positive determination, the circuitry sends a third output control signal to the oscillator circuit to disable the oscillator circuit.

6. The programming circuit according to claim 5, wherein upon the positive determination, the circuitry sends the third output control signal to a charge pump of the voltage generator system to disable the charge pump.

7. The programming circuit according to claim 1, wherein the second input control signal is configured for indicating a pumping speed for the oscillator circuit.

8. The programming circuit according to claim 1, wherein the means for processing the at least one input control signal include means for converting each of the at least one input control signal into at least one binary signal, and means for providing a portion of the at least one binary signal to a bias stage of the series of bias stages for producing current bias of the at least one binary signal by a predetermined current bias.

9. The programming circuit according to claim 1, wherein the means for processing the at least one input control signal processes a coarse component signal and a fine component signal of the at least one input control signal.

10. The programming circuit according to claim 1, wherein the at least one input control signal is received from a processor.

11. The programming circuit according to claim 5, wherein the first output control signal is provided to a gate of a MOS transistor functioning as a current bias of the limiter circuit, and the third output control signal is output from a comparator comparing a voltage level of a Voltage Reference signal and a voltage level of a voltage generated from a node of a resistor chain through which a current produced by the current bias passes.

12. The programming circuit according to claim 8, wherein the predetermined current bias of each bias stage of the series of bias stages is the product of a constant and two raised to a predetermined power.

13. A programmable DC voltage generator system having at least one voltage generator system, a voltage generator system which is one of said at least one voltage generator system comprising:

means for charge pumping;

means for controlling the means for charge pumping including a limiter circuit and an oscillator circuit;

means for programming including:

means for receiving at least one input control signal, the at least one input control signal including a first input control signal and a second input control signal;

means for processing the at least one input control signal using at least a series of bias stages;

means for generating at least one output control signal using at least a signal outputted by the series of bias stages, the at least one output control signal including a first output control signal and a second output control signal; and     means for outputting the at least one output control signal to the means for controlling the means for charge pumping of the voltage generator system for controlling the means for charge pumping in accordance with the at least one input control signal, wherein         the first input control signal is configured for exclusively generating the first output control signal for controlling the limiter circuit and         the second input control signal is configured for exclusively generating the second output control signal for controlling the oscillator circuit.

14. The system according to claim 13, wherein the means for controlling the means for charge pumping includes a limiter circuit and an oscillator circuit, and the output control signal controls at least one of the limiter circuit and the oscillator circuit.

15. The system according to claim 13, wherein the means for processing the at least one input control signal includes a first means for processing the first input control signal and a second means for processing the second input control signal.

16. The system according to claim 15, wherein the first output control signal is output by the first means for processing, and the second output control signal is output by the second means for processing.

17. The system according to claim 15, wherein the first input control signal is configured for indicating a target output voltage for the voltage generator system.

18. The system according to claim 13, wherein upon the positive determination, the circuitry sends the signal to a charge pump of the voltage generator system to disable the charge pump.

19. The system according to claim 13, wherein the second input control signal is configured for indicating a pumping speed for the oscillator circuit.

20. The system according to claim 13, wherein the means for processing the at least one input control signal include means for converting the at least one input control signal into at least one binary signal, and means for providing a portion of the at least one binary signal to a bias stage of the series of bias stages for producing current bias of the at least one binary signal by a predetermined current bias.

21. The system according to claim 13, wherein the means for processing the at least one input control signal processes a coarse component signal and a fine component signal of the at least one input control signal.

22. The system according to claim 13, wherein the at least one input control signal is received from a processor.

\* \* \* \* \*